US009990541B2

(12) United States Patent
Takeno et al.

(10) Patent No.: US 9,990,541 B2
(45) Date of Patent: Jun. 5, 2018

(54) COMMODITY RECOGNITION APPARATUS AND COMMODITY RECOGNITION METHOD

(71) Applicant: TOSHIBA TEC KABUSHIKI KAISHA, Shinagawa-ku, Tokyo (JP)

(72) Inventors: Yuishi Takeno, Shizuoka-ken (JP); Tomonari Kakino, Shizuoka-ken (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 110 days.

(21) Appl. No.: 14/737,800

(22) Filed: Jun. 12, 2015

(65) Prior Publication Data

US 2015/0278591 A1 Oct. 1, 2015

Related U.S. Application Data

(62) Division of application No. 14/084,730, filed on Nov. 20, 2013, now abandoned.

(30) Foreign Application Priority Data

Dec. 3, 2012 (JP) ................................ 2012-264273

(51) Int. Cl.
*G06K 9/00* (2006.01)
*G06K 9/03* (2006.01)
*G07G 1/00* (2006.01)

(52) U.S. Cl.
CPC ......... *G06K 9/00362* (2013.01); *G06K 9/033* (2013.01); *G07G 1/0054* (2013.01)

(58) Field of Classification Search
CPC .. G06Q 10/087; G06Q 30/0641; G06Q 20/20; G06Q 20/208; G06Q 20/203;
(Continued)

(56) References Cited

U.S. PATENT DOCUMENTS

2004/0164844 A1 8/2004 Maeda et al.
2006/0261161 A1* 11/2006 Murofushi ............. G06Q 20/20 235/383

(Continued)

FOREIGN PATENT DOCUMENTS

JP 2000-339550 12/2000

OTHER PUBLICATIONS

Non-Final Office Action for U.S. Appl. No. 14/084,730 dated Mar. 17, 2015, 23 pages.

(Continued)

*Primary Examiner* — Kenny Cese
(74) *Attorney, Agent, or Firm* — Amin, Turocy & Watson LLP

(57) ABSTRACT

A commodity recognition apparatus comprises an image interface configured to acquire the image of a commodity photographed by a camera and a processor configured to detect a commodity image from the images acquired via the image interface, carry out a commodity recognition processing for recognizing commodity candidates according to the feature amount extracted from the commodity image and a code reading processing for reading a commodity recognition code from the same commodity image in parallel, and as a result determine a commodity recognition code if the commodity recognition code is read through the code reading processing or output the result of the commodity recognition processing if no commodity recognition code is read and the photographing period for the commodity is ended.

12 Claims, 12 Drawing Sheets

(58) Field of Classification Search
CPC ....... G06K 2017/0051; G06K 7/10861; G06K 7/1404; G06K 7/1447; G06K 9/00362; G06K 9/033; G07G 1/0054
See application file for complete search history.

(56) References Cited

U.S. PATENT DOCUMENTS

| | | | | |
|---|---|---|---|---|
| 2012/0011148 | A1 | 1/2012 | Rathus et al. | |
| 2012/0099756 | A1 | 4/2012 | Sherman et al. | |
| 2012/0259701 | A1* | 10/2012 | Kumazawa ........ | G06Q 30/0601 705/14.53 |
| 2013/0001295 | A1* | 1/2013 | Goncalves ........... | G07G 1/0063 235/375 |

OTHER PUBLICATIONS

Final Office Action for U.S. Appl. No. 14/084,730 dated Aug. 7, 2015, 28 pages.

* cited by examiner

| COMMODITY ID | COMMODITY NAME | REFERENCE IMAGE 0 | FEATURE AMOUNT DATA 0 |
|---|---|---|---|
| | | REFERENCE IMAGE 1 | FEATURE AMOUNT DATA 1 |
| | | REFERENCE IMAGE 2 | FEATURE AMOUNT DATA 2 |
| | | REFERENCE IMAGE 3 | FEATURE AMOUNT DATA 3 |
| | | REFERENCE IMAGE 4 | FEATURE AMOUNT DATA 4 |
| | | ⋮ | ⋮ |
| | | REFERENCE IMAGE N | FEATURE AMOUNT DATA N |

| No | COMMODITY ID | COMMMODITY NAME | REFERENCE IMAGE | SIMILARITY DEGREE |
|---|---|---|---|---|
| 1 | | | | |
| 2 | | | | |
| 3 | | | | |
| 4 | | | | |
| 5 | | | | |

| TRANSACTION DATE | REGISTRATION NUMBER | TRANSACTION NUMBER |
|---|---|---|
| REGISTRATION NUMBER | CANDIDATE COMMODITY INFORMATION | |
| | | |
| | | |
| | | |
| | | |
| ⋮ | ⋮ | |

| No | COMMODITY NAME | UNIT PRICE | QUANTITY | AMOUNT |
|----|----------------|------------|----------|--------|
| 1  | MILK           | 175        | 1        | 175    |
| 2  | ONION          | 250        | 1        | 250    |
| 3  |                |            |          |        |
| 4  |                |            |          |        |
| 5  |                |            |          |        |

APPLE — 711
PERSI-MMON — 712
PEACH — 713

TWO ITEMS     ¥ 325

| | |  |  |
|---|---|---|---|
| 1.ONION | 62% | CORRECT | ADD |
| 2.POTATO | 18% | CORRECT | ADD |
| 3.TARO | 11% | CORRECT | ADD |
| 4.LEMON | 5% | CORRECT | ADD |
| 5.GARLIC | 4% | CORRECT | ADD |

CLOSE

| No | COMMODITY NAME | UNIT PRICE | QUANTITY | AMOUNT |
|---|---|---|---|---|
| 1 | MILK | 175 | 1 | 175 |
| 2 | POTATO | 200 | 1 | 200 |
| 3 | APPLE | 100 | 1 | 100 |
| 4 | | | | |
| 5 | | | | |

703

702

THREE ITEMS ¥ 475

| TRANSACTION DATE | REGISTRATION NUMBER | TRANSACTION NUMBER |
|---|---|---|
| REGISTRATION NUMBER | COMMODITY IMAGE | |
| | | |
| | | |
| | | |
| | | |
| ⋮ | ⋮ | |

COMMODITY RECOGNITION APPARATUS AND COMMODITY RECOGNITION METHOD

CROSS-REFERENCE TO RELATED APPLICATIONS

This application is a Division of application Ser. No. 14/084,730 filed Nov. 20, 2013, the entire contents of which are incorporated herein by reference.

This application is based upon and claims the benefit of priority from Japanese Patent Application No. 2012-264273, filed Dec. 3, 2012, the entire contents of which are incorporated herein by reference.

FIELD

Embodiments described herein relate to a commodity recognition apparatus using a camera and a commodity recognition method for a computer to function as the commodity recognition apparatus.

BACKGROUND

One of the optical codes affixed to a commodity is barcode. Most of the commodities sold in a supermarket are affixed with a barcode including a commodity recognition code. A commodity recognition apparatus is being widely popularized which recognizes a commodity recognition code by scanning a barcode with a scanner.

However, not all commodities are affixed with a barcode. For example, vegetables, fruits and side dishes which are sold by retail are often affixed with no barcode. Thus, in order to cope with a commodity affixed with no barcode, a commodity recognition apparatus is provided which uses a display device as a touch panel. The apparatus displays the image of a commodity affixed with no barcode on the screen of the touch panel. If a commodity image is selected through the touch input of the operator, then the commodity recognition apparatus determines a commodity recognition code associated with the selected commodity image.

BRIEF DESCRIPTION OF THE DRAWINGS

FIG. 3 is a schematic diagram illustrating the structure of dictionary data for each commodity stored in a recognition dictionary file;

FIG. 4 is a schematic diagram illustrating the area structure of a candidate commodity memory;

FIG. 5 is a schematic diagram illustrating the area structure of a recognition result holding memory;

FIG. 14 is a plane view illustrating an example of a registration screen on which commodity data is corrected;

FIG. 15 is a schematic diagram illustrating the area structure of a commodity image holding memory;

DETAILED DESCRIPTION

In accordance with an embodiment, a commodity recognition apparatus comprises an image interface configured to acquire the image of a commodity photographed by a camera; a connection interface configured to carry out data communication with an external machine; a display configured to display candidate commodities recognized according to the commodity image acquired via the image interface; a memory configured to hold information of the candidate commodities recognized according to the commodity image; and a processor.

The processor is configured to recognize, according to the commodity image read via the image interface, candidates for the commodity displayed in the commodity image, specify the commodity displayed in the image from the recognized candidate commodities, output information of the specified commodity to the external device via the connection interface while storing information of the candidate commodities in the memory in association with information relating to the specific commodity specified from the candidate commodities, and display the candidate commodities on the display based on the information of the candidate commodities held in the memory in association with the information relating to the specific commodity if a selection request of the specific commodity is accepted.

This embodiment is a case where the functions according to the present invention are used in the commodity recognition apparatus included in a store checkout system used in a retail store.

First, the commodity recognition apparatus described in the embodiment applies a general object recognition technology. General object recognition refers to a technology for recognizing the category of an object according to the image data obtained by photographing a target object (object) with a camera. A computer extracts the appearance feature amount of an object contained in the image from the image data. Then, the computer calculates a similarity degree by comparing the extracted appearance feature amount with the feature amount data of a reference image registered in a recognition dictionary file and recognizes the category of the object according to the similarity degree. The technology for recognizing an object contained in an image is described in the following documents:

YANAI Keiji, 'The current state and further directions on General Object Recognition', in proceedings of Information Processing Society of Japan, Vol. 48, No SIG 16, In URL: http://mm.cs.uec.ac.jp/IPSJ-TCVIM-Yanai.pdf [retrived on Aug. 10, 2010].

In addition, the technology carrying out general object recognition through regional image segmentation for each object is described in following document:

Jamie Shotton: "Semantic Texton Forests for Image Categorization and Segmentation", In URL:http://citeseerx-.ist.psu.edu/viewdoc/download?doi=10.1.1.145.3036&rep=repl&type=pdf (retrieved on Aug. 10, 2010).

Embodiment 1

Figure 1:
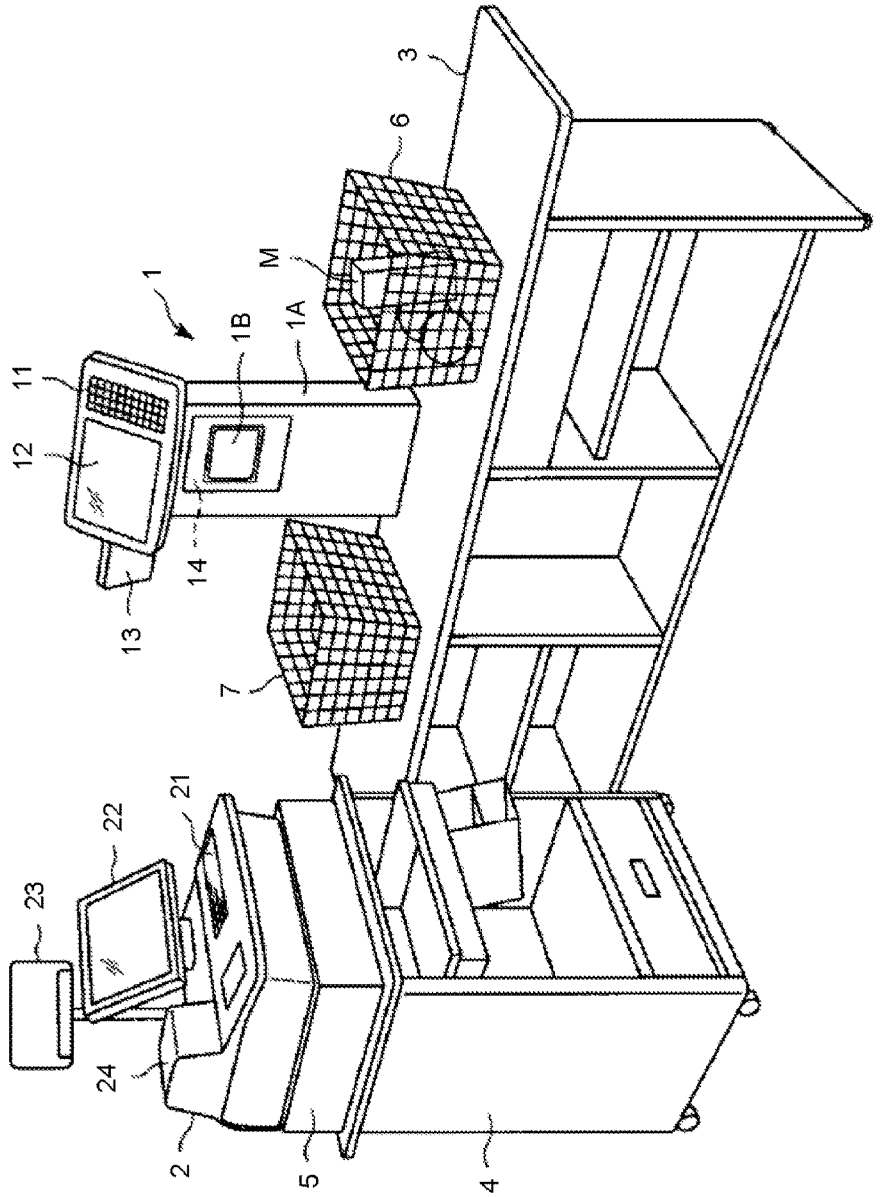
FIG. 1 is a diagram illustrating the external appearance of a store checkout system.

FIG. 1 is a diagram illustrating the external appearance of a store checkout system. The system comprises a commodity recognition apparatus 1 for recognizing a commodity purchased by a customer and a POS terminal 2 for registering the sales data of the commodity recognized using the commodity recognition apparatus 1 and settling a commodity transaction. The commodity recognition apparatus 1 is arranged on a checkout counter 3. The POS terminal 2 is arranged on a register table 4 via a drawer 5. The POS terminal 2 comprises a keyboard 21, a display 22 for operator, a display 23 for customer and a receipt printer 24, which serve as necessary devices for settlement. The commodity recognition apparatus 1 is electrically connected with the POS terminal 2 through a communication cable 400 (refer to FIG. 2).

The checkout counter 3 takes an elongated shape along a customer passage in the rear side. The register table 4 is arranged at the nearer side of the end part of the checkout counter 3 and is located at the downstream side of the movement direction of the customers moving along the checkout counter 3 and is placed substantially vertical to the checkout counter 3. Moreover, the nearer side of the checkout counter 3 and the nearer side of the register table 4 form a space for a cashier, that is, a shop clerk in charge of checkout.

The commodity recognition apparatus 1 comprises a keyboard 11, a touch panel 12 and a display 13 for customer. The display and input devices (the keyboard 11, the touch panel 12 and the display 13 for customer) are arranged on a housing 1A constituting the main body of the commodity recognition apparatus 1. The housing 1A in a thin rectangular shape is vertically arranged substantially in the center of the checkout counter 3. The keyboard 11 and the touch panel 12 are arranged on the housing 1A with the operation surface thereof facing the cashier. The display 13 for customer is arranged on the housing 1A with the display surface thereof facing a customer passage side.

A camera 14 is included in the housing 1A. Further, a rectangular-shaped reading window 1B is formed on the front side of the housing 1A (the side of the cashier). The camera 14 comprises a CCD (Charge Coupled Device) photographing element serving as an area image sensor and the drive circuit thereof as well as a photographing lens for imaging an image of a photographed area on the photographing lens of the CCD photographing element. The photographed area refers to the area of a frame image that is imaged in the area of the CCD photographing element through the photographing lens from the reading window 1B. The camera 14 outputs the image imaged in the photographing area of the CCD photographing element through the photographing lens.

Further, the camera 14 is not limited to be the structure described above. In the embodiment, the camera 14 may be any device that has a function of photographing a commodity.

The commodity receiving surface across the commodity recognition apparatus 1 on the checkout counter 3 which is located on the upstream side of customer movement direction forms a space for accommodating a shopping basket 6 in which the commodities M purchased by a customer but not registered yet are placed. On the other hand, a commodity receiving surface on a downstream side of customer movement direction forms a space for accommodating a shopping basket 7 in which the commodities M recognized by the commodity recognition apparatus 1 are placed.

Figure 2:
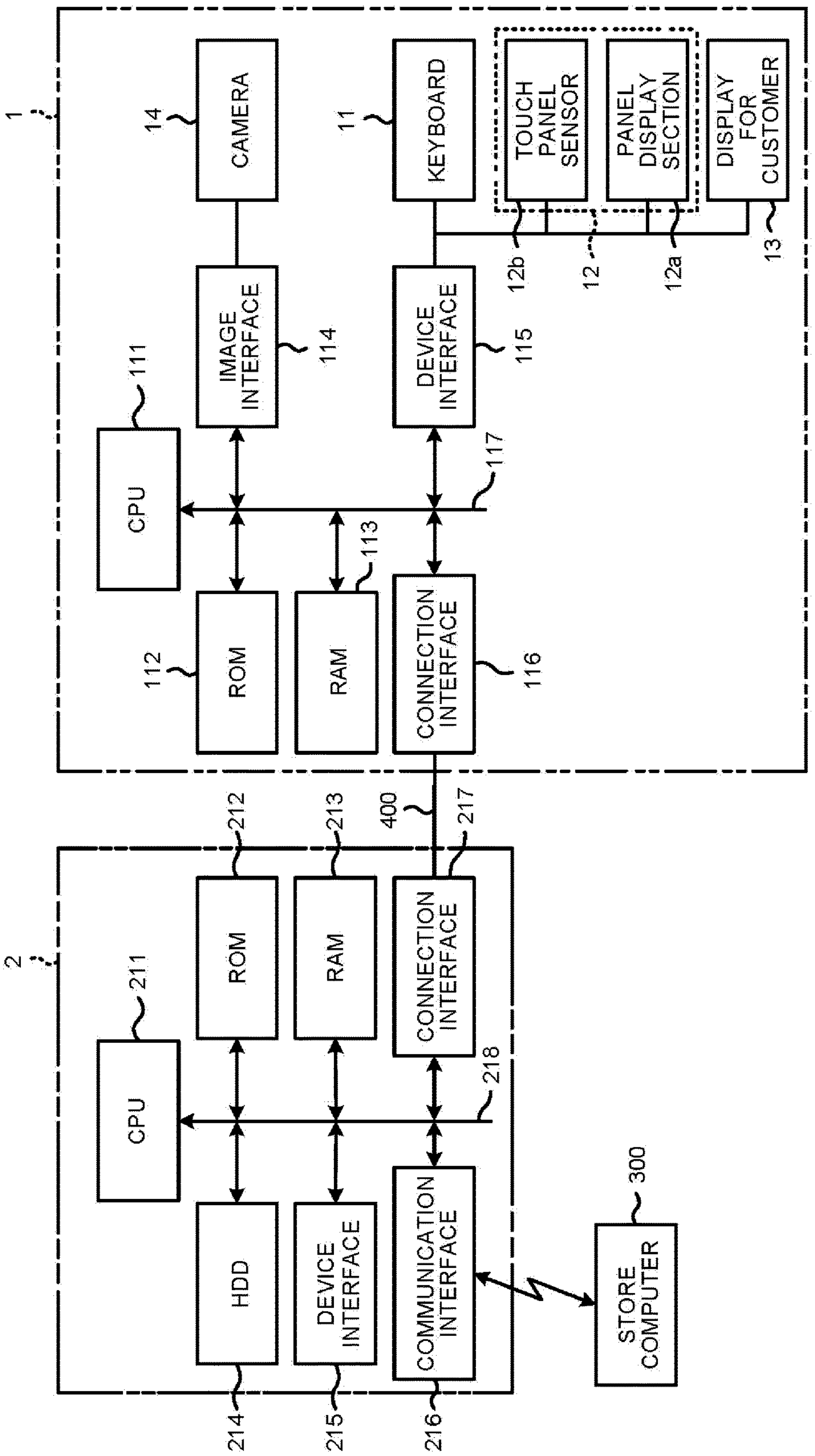
FIG. 2 is a block diagram illustrating hardware configurations of a commodity recognition apparatus and a POS terminal.

FIG. 2 is a block diagram illustrating hardware configurations of the commodity recognition apparatus 1 and the POS terminal 2. The commodity recognition apparatus 1 consists of a primary control section, a primary storage section and an input/output section. The primary control section is a CPU (Central Processing Unit) 111. The primary storage section consists of a ROM (Read Only Memory) 112 and a RAM (Random Access Memory) 113. The input/output section consists of an image interface 114, a device interface 115 and a connection interface 116. The CPU 111 is connected with the ROM 112, the RAM 113 and the interfaces 114, 115 and 116 via a bus line 117 such as an address bus or a data bus.

Further, the primary control section may also be a processor different from a CPU. Further, the input/output section may include other interfaces.

The image interface 114 is connected with the camera 14. The image photographed by the camera 14 is acquired by the commodity recognition apparatus 1 through the image interface 114 and stored in the RAM 113. The device interface 115 is connected with the keyboard 11, the touch panel 12 and the display 13 for customer. The touch panel 12 consists of a panel display section 12*a* and a touch panel sensor 12*b* which is superposed on the screen of the panel display section 12*a*.

The POS terminal 2 consists of a primary control section, a primary storage section, an auxiliary storage section and an input/output section. The primary control section is a CPU 211. The primary storage section consists of a ROM 212 and a RAM 213. The auxiliary storage section is an HDD (Hard Disk Drive) 214. The input/output section consists of a device interface 215, a communication interface 216 and a connection interface 217. The CPU 211 is connected with the ROM 212, the RAM 213, the HDD 214 and the interfaces 215, 216, 217 via a bus line 218 such as an address bus or a data bus.

Further, the primary control section may also be a processor different from a CPU. The input/output section may include other interfaces. The auxiliary storage section is not limited to be the HDD 214. For example, the auxiliary storage section may also be a SSD (Solid State Drive).

The device interface 215 is connected with the keyboard 21, the display 22 for operator, the display 23 for customer, the printer 24 and the drawer 5, which are all saved in FIG. 2. A closing key is arranged on the keyboard 21 to declare a settlement for a commodity transaction. The closing key includes a prepayment/cash total key declaring a settlement according to a cash transaction and a credit card total key declaring a settlement based on a credit card transaction.

The communication interface 216 is connected, through a network such as an LAN (Local Area Network), with a store computer 300 serving as the center of a store. It becomes possible for the POS terminal 2 to carry out data transmission/reception with the store computer 300 through this connection. For example, the POS terminal 2 receives a recognition dictionary file 500 which will be described later from the store computer 300 through the communication interface 216. The recognition dictionary file 500 is stored in the HDD 214.

The connection interface 217 is connected with the connection interface 116 of the commodity recognition apparatus 1 via the communication cable 400. Through this connection, the POS terminal 2 displays commodity sales data on the touch panel 12 and the display 13 for customer of the commodity recognition apparatus 1. The commodity recognition apparatus 1 can access the recognition dictionary file 500 stored in the HDD 214 of the POS terminal 2.

In the embodiment, a commodity affixed with no barcode serving as an optical code, is taken as a recognition target commodity. The recognition dictionary file 500 stores dictionary data of each recognition target commodity. FIG. 3 is a schematic diagram illustrating the structure of dictionary data. As shown in FIG. 3, in the recognition dictionary file 500, each recognition target commodity is associated with a commodity ID and a commodity name, and a plurality of pairs of reference image data 0-N and feature amount data 0-N are stored for each recognition target commodity. The commodity ID, which is a commodity recognition code for recognizing a commodity, is contained in a barcode affixed to the commodity.

The reference image data 0-N is data of images obtained by photographing a commodity recognized using a corresponding commodity ID from a plurality of directions. The feature amount data 0-N is data resulting from the parameterization of the appearance feature amount extracted from reference images 0-N of a corresponding commodity as surface information (appearance shape, tint, pattern and concave-convex) of the commodity.

Further, the number (N+1) of the feature amount data and the reference image data for a commodity is not fixed, different commodities having different data numbers (N+1). Further, not all the reference image data 0-N are stored in the recognition dictionary file 500, and any of the reference image data 0-N may be stored in the recognition dictionary file 500.

The commodity recognition apparatus 1 has an image detection function, a reading function, a feature amount extraction function, a similarity degree calculation function, a commodity recognition function, an output function, a storage function, a redisplay function, a reuse function and a clearing function as functions for determining a commodity M held over the photographing area of the camera 14 as a commodity for sale.

Further, the commodity recognition apparatus 1 is provided with a candidate commodity memory 610 having the area structure shown in FIG. 4 and a recognition result holding memory 620 having the area shown in FIG. 5, which function as memory areas necessary for achieving the functions above in the RAM 113. Further, the candidate commodity memory 610 and the recognition result holding memory 620 may also be formed in a memory medium different from the RAM 113, for example, in the RAM 213 or the HDD 214 of the POS terminal 2.

As shown in FIG. 4, the candidate commodity memory 610 has areas for storing each data of commodity IDs, commodity names, reference images and similarity degrees in the ranking from first to fifth. Further, in the candidate commodity memory 610, the ranking are not limited to the first to the fifth. For example, the number of the digits of the data stored is set optionally by the system user As shown in FIG. 5, the recognition result holding memory 620 has an area for storing a transaction date, a registration number and a transaction number which uniquely specify information of a commodity transaction and an area for storing candidate commodity information in association with a registration number. Further, information for uniquely specifying a commodity transaction is not limited to be all of the transaction date, the registration number and the transaction number. Part of the transaction date, the registration number and the transaction number or other elements may be contained to specify a commodity transaction uniquely.

With the image detection function, a commodity image is detected from commodity images taken by the camera 14. With the reading function, a barcode is read from the commodity image detected using the image detection function. Further, with the reading function, another optical code such as a two-dimensional data code, instead of a barcode, may also be read.

With the feature amount extraction function, the appearance feature amount of a commodity the image of which is detected using the image detection function is extracted from the commodity. With the similarity degree calculation function, the appearance feature amount extracted using the feature amount extraction function is compared with the feature amount data of each recognition target commodity stored in the recognition dictionary file 500. With the similarity degree calculation function, for each recognition target commodity, a similarity degree representing how similar the appearance feature amount data is similar to the feature amount data is calculated. With the commodity recognition function, candidates for the commodity photographed by the camera 14 are recognized based on the similarity degree of the recognition target commodity calculated using the similarity degree calculation function. Information (commodity ID, commodity name, reference image and similarity degree) of the recognized candidate commodity is stored in the candidate commodity memory 610.

With the output function, when a barcode is read using the reading function, a commodity ID obtained by analyzing the barcode is output to the POS terminal 2 through the connection interface 116 as the commodity ID of the commodity photographed by the camera 14. Further, with the output function, if the commodity displayed in the commodity image is specified from the candidate commodities recognized using the commodity recognition function, the commodity ID of the specified commodity is output to the POS terminal 2 through the connection interface 116 as the commodity ID of the commodity photographed by the camera 14.

With the storage function, the information of the candidate commodities stored in the candidate commodity memory 610 is stored in the recognition result holding memory 620 in association with registration numbers. The registration number is equivalent to information relating to the specific commodity specified from the candidate commodities.

With the redisplay function, if a selection request of the specific commodity from the POS terminal 2 is accepted, the information of the candidate commodity held in the recognition result holding memory 620 in association with the information (registration number) relating to the specific commodity is read. Then, with the redisplay function, a screen for the reuse of the candidate commodity is displayed on the touch panel 12 based on the read candidate commodity information. With the reuse function, a commodity is corrected or added based on the data input through the screen. With the clearing function, the recognition result holding memory 620 is cleared at a specific timing, that is, after a settlement of a commodity transaction involving the specific commodity is completed, in the POS terminal 2.

Figure 6:
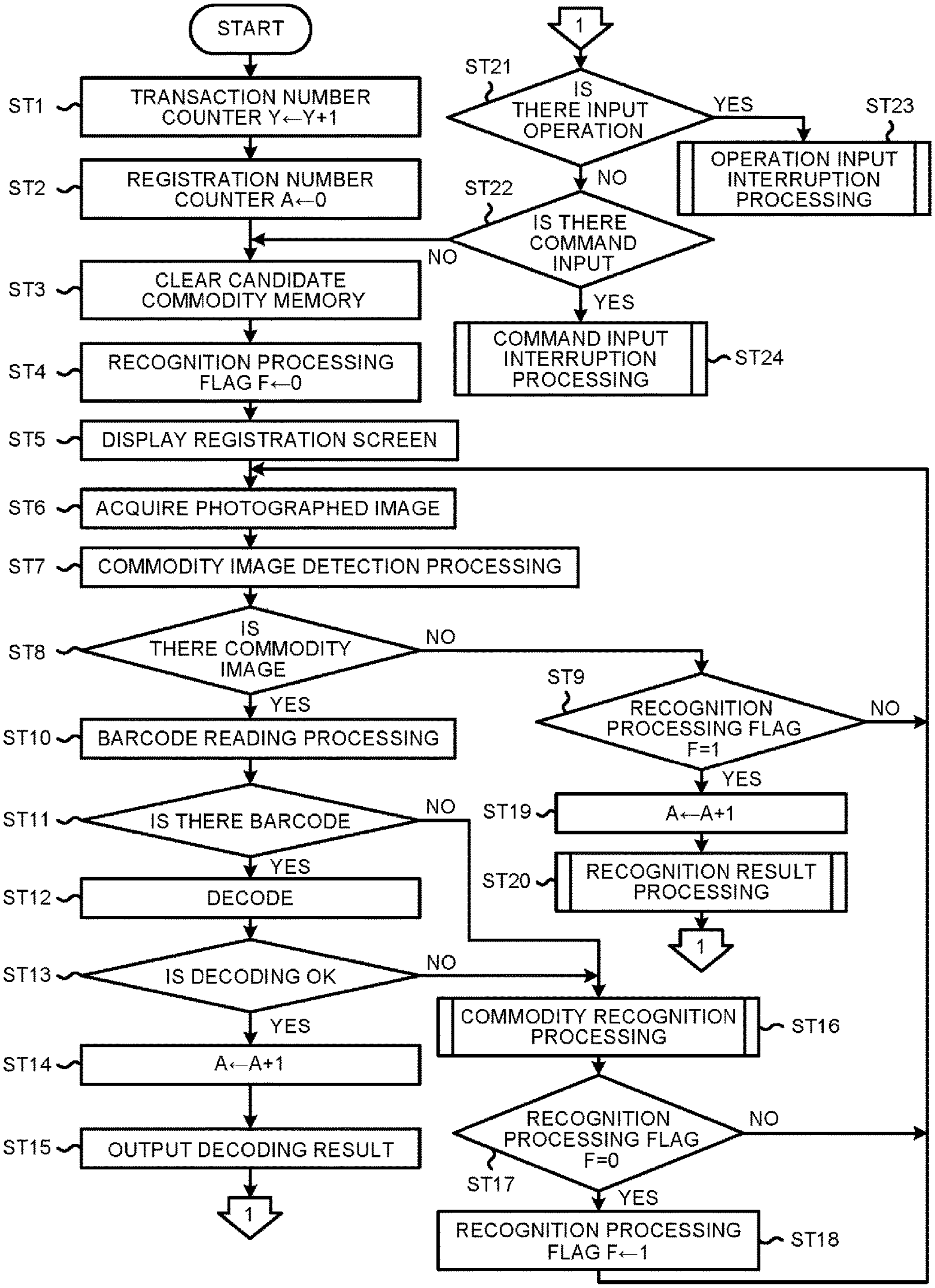
FIG. 6 is a flowchart illustrating the procedure of the information processing executed by the CPU of a commodity recognition apparatus according to a commodity recognition program.

In order to achieve these functions, the commodity recognition apparatus 1 stores commodity recognition programs in the ROM 112. The CPU 111 of the commodity recognition apparatus 1 executes an information processing the procedure of which is shown in FIG. 6 according to the aforementioned commodity recognition programs.

First, the CPU 111 executes each processing in Acts ST1-ST5. In ACT ST1, the CPU 111 only adds '1' to a transaction number counter Y. In ACT ST2, the CPU 111 resets a registration number counter A to be '0'. The transaction number counter Y and the registration number counter A are stored in, for example, the RAM 113. In ACT ST3, the CPU 111 clears the candidate commodity memory 610. In ACT ST4, the CPU 111 resets a recognition processing flag F to be '0'. The recognition processing flag F is stored in, for example, the RAM 113. In ACT ST5, the CPU 111 displays a registration screen 700 on the panel display section 12*a* of the touch panel 12.

Figure 11:
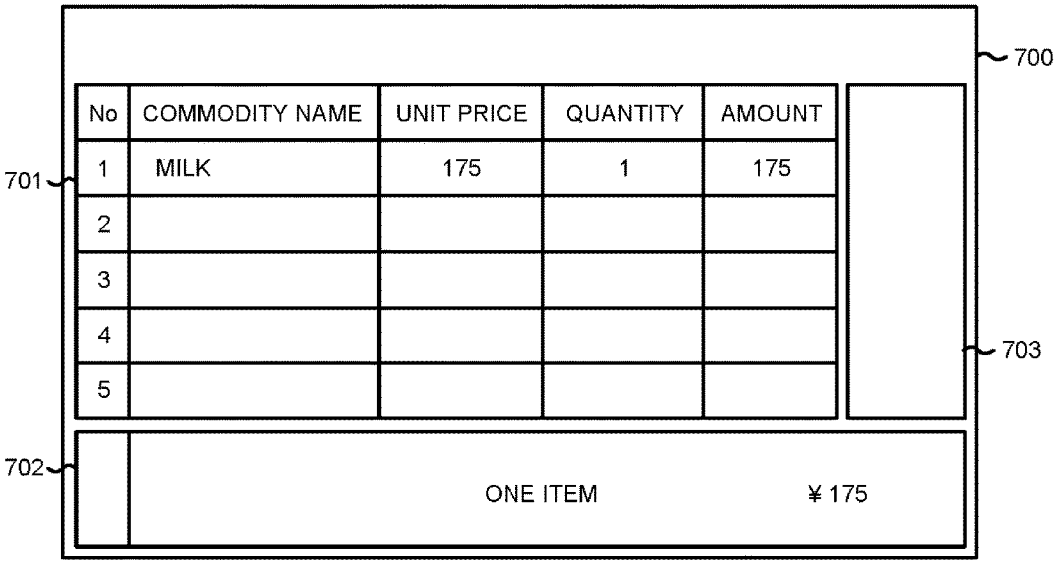
FIG. 11 is a plane view illustrating an example of a registration screen.

An example of the registration screen 700 is shown in FIG. 11. The registration screen 700 includes a detail area 701, a total area 702 and a candidate area 703. The detail area 701 is divided into a plurality of rows. The commodity name, the unit price, the quantity and the sales amount of a registered commodity are displayed as a commodity for sale corresponding to a series of row numbers in each row in the detail area 701. The total item and the total amount of registered commodities are displayed in the total area 702. The commodity names and the reference images stored in the candidate commodity memory 610 are displayed in the candidate area 703 from the first in order.

The CPU 111 acquires the images (frame images) photographed by the camera 14 through the image interface 114 (ACT ST6). The acquired photographed images are stored in the image buffer of the RAM 113.

The CPU 111 analyzes the photographed images stored in the image buffer to detect a commodity image from the photographed images (ACT ST7: image detection function). Specifically, the CPU 111 extracts a contour line from an image resulting from the binarization of the frame images. Then, the CPU 111 attempts to extract the contour line of the object displayed in the image. If the contour line of an object is extracted, then the CPU 111 deems the image in the contour line as a commodity image.

The CPU 111 confirms whether or not a commodity image is detected from the photographed images (ACT ST8). If no commodity image is detected (NO in ACT ST8), the CPU 111 confirms the state of the recognition processing flag F (ACT ST9). At this time, the recognition processing flag F is reset to be '0'. Thus, the CPU 111 returns to carry out the processing in ACT ST6. That is, the CPU 111 acquires the next frame image from the camera 14 and executes a commodity image detection processing.

In this way, the CPU 111 acquires a frame image from the camera 14 at a time and executes a commodity image detection processing. A commodity image is detected from frame images when a commodity is held over the reading window 1B. If a commodity image is detected (YES in ACT ST8), then the CPU 111 analyzes the commodity image and attempts to read a barcode (ACT ST10: reading function). A barcode reading technology based on image analysis is disclosed in, for example, the Japanese Unexamined Patent Application Publication No. 2008-033640.

The CPU 111 confirms whether or not a barcode is read from a commodity image (ACT ST11). If a barcode is read (YES in ACT ST11), the CPU 111 decodes the barcode (ACT ST12). Then, the CPU 111 confirms whether or not the barcode can be decoded (ACT ST13). If the barcode can be decoded (YES in ACT ST13), the CPU 111 executes each processing in ACTs 14 and 15. In ACT ST14, the CPU 111 only adds '1' to a registration number counter A. In ACT ST15, the CPU 111 outputs the decoding result of the barcode to the POS terminal 2 through the connection interface 116 (output function).

If no barcode is read from a commodity image in ACT ST11 (NO in ACT ST11) or the barcode cannot be decoded in ACT ST13 (NO in ACT ST13), the CPU 111 executes a commodity recognition processing (ACT ST16).

Figure 7:
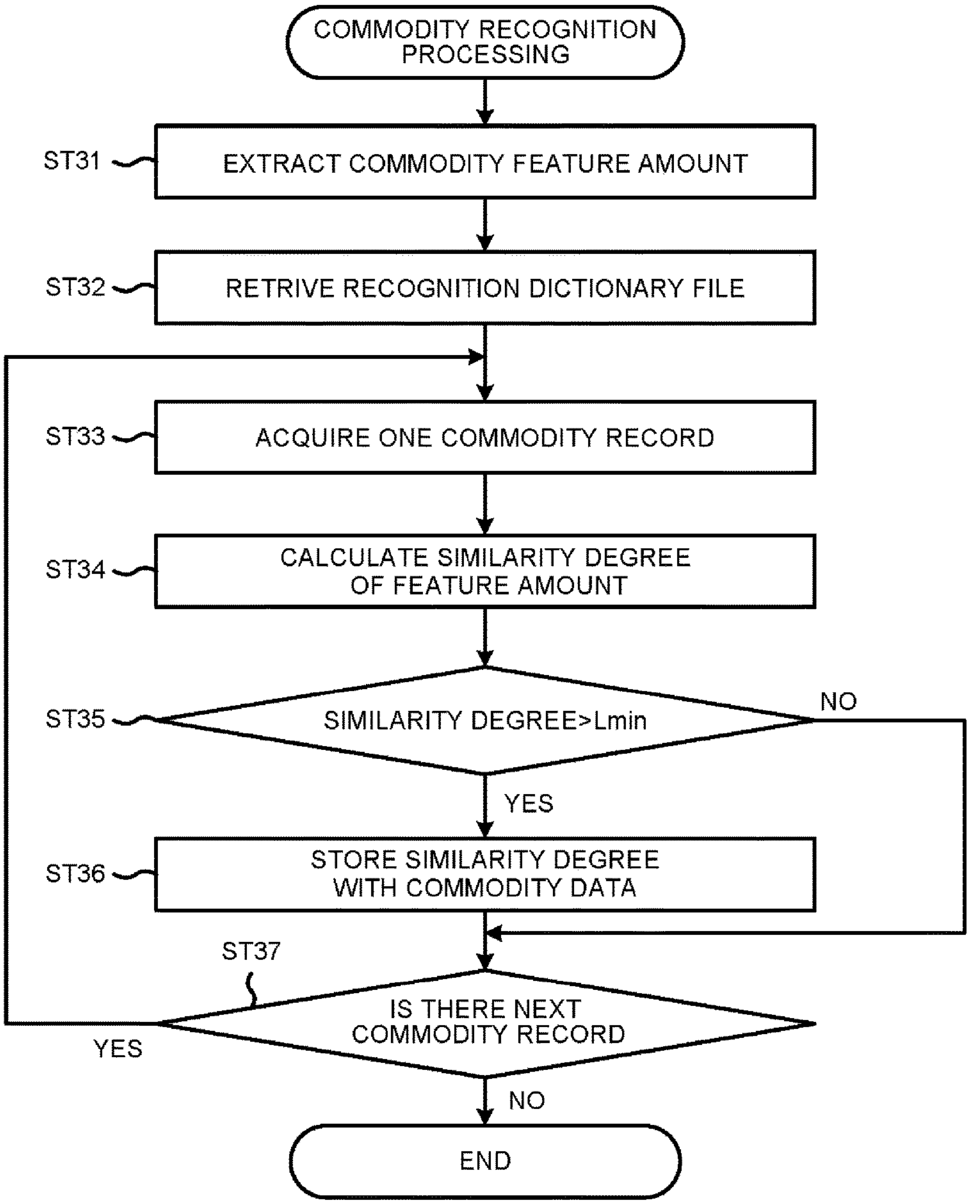
FIG. 7 is a flowchart specifically illustrating the sequence of a commodity recognition processing.

FIG. 7 is a flowchart specifically illustrating the procedure of the commodity recognition processing. First, the CPU 111 extracts the appearance feature amount of a commodity from the commodity image detected in the processing in ACT ST7 (ACT ST31: feature amount extraction function). The appearance feature amount includes the shape, the surface tint, the pattern and the concave-convex of a commodity. If the appearance feature amount of a commodity is extracted, the CPU 111 accesses the HDD 214 of the POS terminal 2 to retrieve the recognition dictionary file 500 (ACT ST32). Then, the CPU 111 reads the data record (commodity ID, commodity name, reference images 0-N and feature amount data 0-N) of a commodity from the recognition dictionary file 500 (ACT ST33).

If the data record of a commodity is read, then the CPU 111 calculates the similarity degree of each of the feature amount data 0-N in the record. The similarity degree represents how similar the feature amount data 0-N is to the appearance feature amount of the commodity extracted in the processing in ACT ST31. The CPU 111 determines the maximum value of the similarity degrees calculated for each feature amount data 0-N to be the similarity degree of the recognition target commodity specified using the commodity ID in the record to the commodity photographed by the camera 14 (ACT ST34: similarity degree calculation function). Further, the sum value or the average value of the similarity degrees calculated for each feature amount data 0-N may also be determined to be the similarity degree of the recognition target commodity to the photographed commodity.

The CPU 111 confirms whether or not the similarity degree determined in the processing in ACT ST34 is greater than a preset candidate threshold value Lmin (ACT ST35). The candidate threshold value Lmin is the lower limit value of similarity degrees leaving the recognition target commodities as candidate commodities. When the similarity degree is not greater than the candidate threshold value Lmin (NO in ACT ST35), the CPU 111 proceeds to the processing in ACT ST37.

If the similarity degree is greater than the candidate threshold value Lmin (YES in ACT ST35), the CPU 111 stores the similarity degree and the commodity ID, the commodity name and the reference image in the record in the candidate buffer of the RAM 113 (ACT ST36). The reference image, for example, is selected to be a reference image paired up with the feature amount data having the maximum similarity degree. Then, the CPU 111 proceeds to the processing in ACT ST37.

In ACT ST37, the CPU 111 confirms whether or not there is an unprocessed data record in the recognition dictionary file 500. If there is an unprocessed data record in the recognition dictionary file 500 (YES in ACT ST37), the CPU 111 returns to the processing in ACT ST33, that is, the CPU 111 reads the unprocessed data record from the recognition dictionary file 500 and then executes the processing in ACT ST34-ACT ST36 again.

The commodity recognition processing is ended if there is no unprocessed data record in the recognition dictionary file 500 (NO in ACT ST37).

If the commodity recognition processing is ended, the CPU 111 checks the state of the recognition processing flag F (ACT ST17). If the recognition processing flag F is reset to be '0' (YES in ACT ST17), the CPU 111 sets the recognition processing flag F to be '1' (ACT ST18). The processing in ACT ST18 is not executed if the recognition processing flag F has been set to be '1' (NO in ACT ST17). The CPU 111 returns to the processing in ACT ST6. That is, the CPU 111 acquires the next frame image from the camera 14 and executes a commodity image detection processing.

A commodity image is detected from frame images during the period from the moment a commodity is held over a reading window 1B to the moment the commodity is out of the photographing area of the camera 14. Thus, during this period, the CPU 111 carries out the processing in and after ACT ST10. That is, the CPU 111 carries out a barcode reading processing and a commodity recognition processing in parallel using the commodity image detected from the frame images. Then, if a barcode is read through the barcode reading processing, the CPU 111 outputs the commodity ID decoded according to the barcode to the POS terminal 2.

If no barcode can be read and the commodity M is out of the photographing area of the camera 14, then no commodity image is detected from the frame images. At this time, the recognition processing flag F is set to be '1' (YES in ACT ST9). Thus, the CPU 111 only adds '1' to the registration number counter A (ACT ST19) and then carries out a recognition result processing (ACT ST20).

Figure 8:
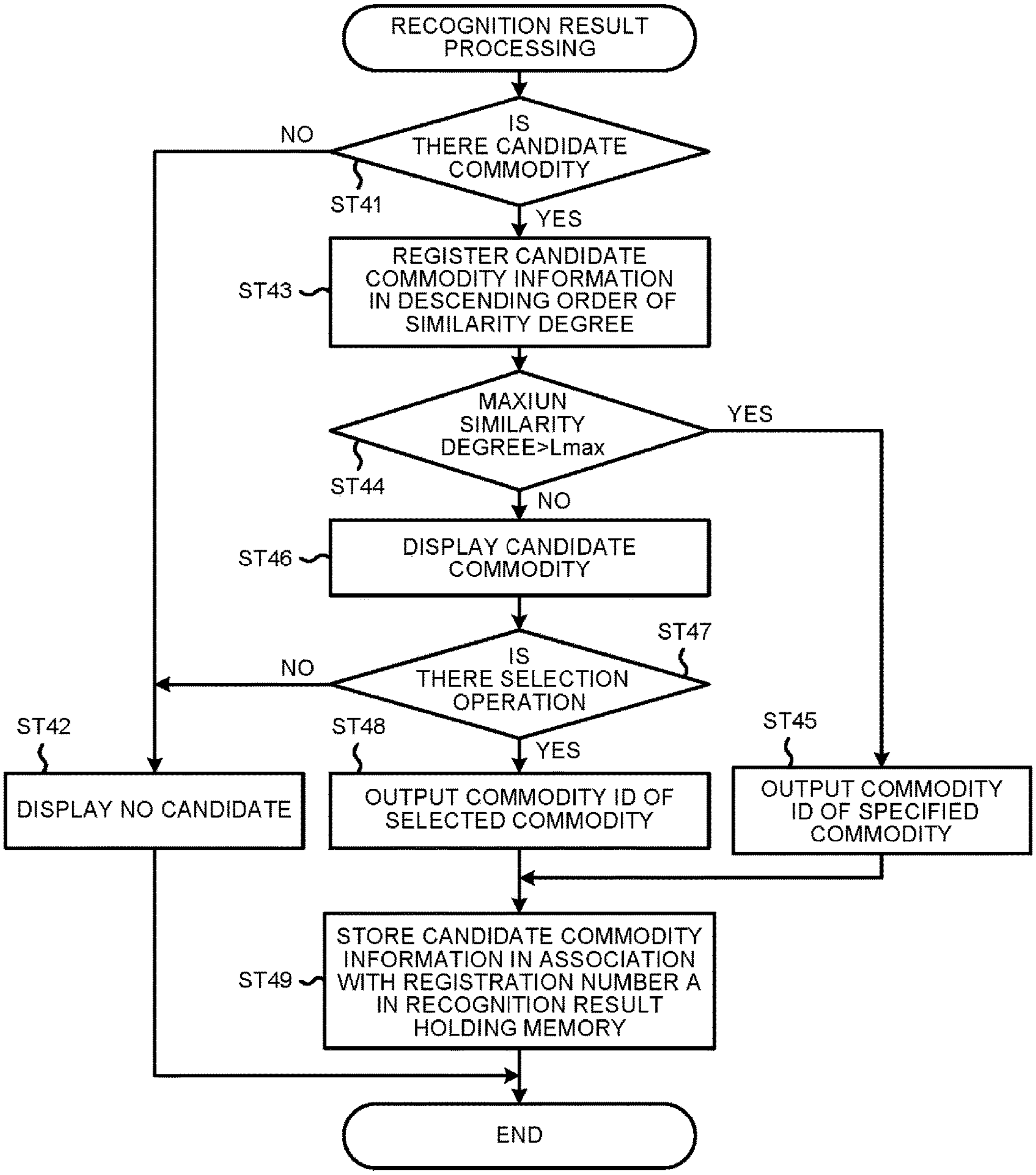
FIG. 8 is a flowchart specifically illustrating the procedure of a recognition result processing.

FIG. 8 is a flowchart specifically illustrating the procedure of the recognition result processing. First, the CPU 111 confirms whether or not data (commodity ID, commodity name, reference image and similarity degree) is stored in the candidate buffer (ACT ST41). When no data is stored in the candidate buffer (NO in ACT ST41), the CPU 111 displays a message 'no candidate' in the candidate area 703 on the registration screen 700 (ACT ST42).

If there is data stored in the candidate buffer (YES in ACT ST41), the CPU 111 rearranges the data in the candidate buffer in descending order of similarity degree. Then, the CPU 111 selects the data (commodity IDs, commodity names, reference images and similarity degrees) having the top five similarity degrees and registers the selected data in the candidate commodity memory 610 in order from the first (ACT ST43: commodity recognition function). The CPU 111 clears the candidate buffer after the data registration is ended.

Next, the CPU 111 confirms whether or not the similarity degree of the data registered in the first in the candidate commodity memory 610, that is, the maximum similarity degree, is greater than a preset determination threshold value Lmax (Lmax>Lmin) (ACT ST44). The determination threshold value Lmax is the lower limit value of the similarity degrees according to which a recognition target commodity can be determined to be a commodity held over the reading window 1B.

If the maximum similarity degree is greater than the determination threshold value Lmax (YES in ACT ST44), the CPU 111 reads the commodity ID of the data registered in the first from the candidate commodity memory 610. If the maximum similarity degree exceeds the determination threshold value Lmax, then the commodity recognized with the commodity ID can be specified as a commodity held over the reading window 1B. The CPU 111 outputs the commodity ID read from the candidate commodity memory 610 to the POS terminal 2 through the connection interface 116 (ACT ST45: output function). Then, the CPU 111 carries out the processing in ACT ST49.

If the maximum similarity degree is below the determination threshold value Lmax (NO in ACT ST44), the CPU 111 displays images of the candidate commodities in the candidate area 703 according to the order registered in the candidate commodity memory 610 (ACT ST46).

Figure 12:
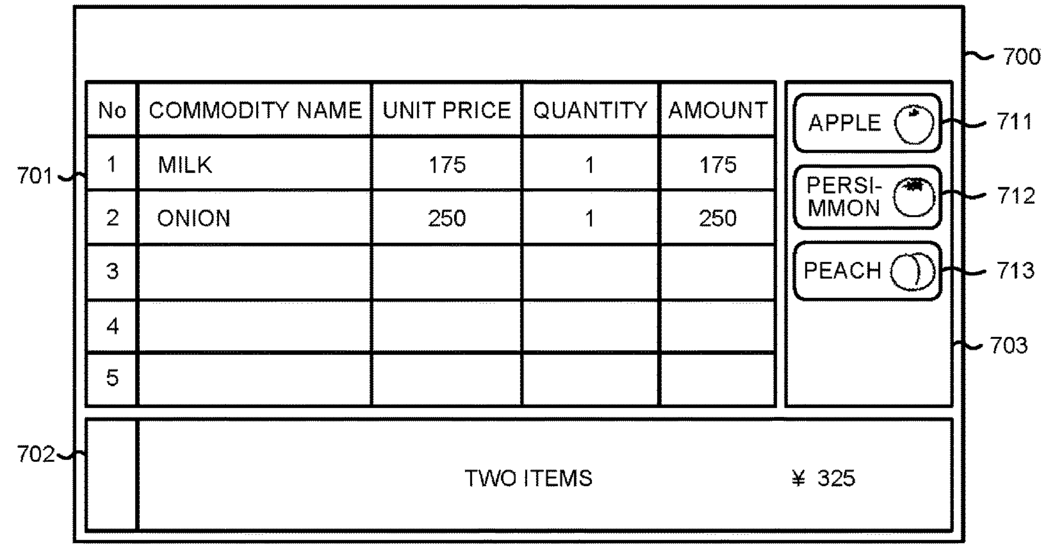
FIG. 12 is a plane view illustrating an example of commodity candidates displayed on a registration screen.

An example of the registration screen 700 on which images of candidate commodities are displayed is shown in FIG. 12. In the example, 'apple', 'persimmon' and 'peach' are recognized as candidate commodities. The similarity degree of 'apple' is highest while that of 'peach' is lowest. In this case, as shown in FIG. 12, a button image 711 for selecting 'apple', a button image 712 for selecting 'persimmon' and a button image 713 for selecting 'peach' are displayed in the candidate area 703.

If the button images 711, 712 and 713 of candidate commodities are displayed, then the CPU 111 confirms whether or not one of the candidate commodities is selected optionally (ACT ST47). If one of the button images is touched and input optionally, then the CPU 111 specify the commodity displayed on the button image to be a commodity held over the reading window 1B. The CPU 111 outputs the commodity ID of the commodity to the POS terminal 2 through the connection interface 116 (ACT ST48: output function). Then, the CPU 111 carries out the processing in ACT ST49.

Every time receives a commodity ID from the commodity recognition apparatus 1, the CPU 211 of the POS terminal 2 retrieves the commodity master file to acquire commodity information, such as the commodity name and the unit price, of the commodity recognized using the commodity ID. The CPU 211 registers commodity sales data containing sales volume and sales amount based on the commodity information detected from the commodity master file. Further, the CPU 211 sends the data of the commodity name, the unit price, the quantity and the amount to the commodity recognition apparatus 1 through the connection interface 217. The CPU 111 of the commodity recognition apparatus 1 displays the commodity name, the unit price, the quantity and the amount received from the POS terminal 2 in the detail area 701 of the registration screen 700 displayed on the panel display section 12*a* as well as on the display 13 for customer. At this time, in the detail area 701, the data is displayed in the row the row number of which is accordant with the value of the registration number counter A.

In ACT ST49, the CPU 111 stores the value of the registration number counter A and candidate commodity information in the recognition result holding memory 620. The candidate commodity information is data (commodity ID, commodity name, reference image and similarity degree) of each candidate commodity stored in the candidate commodity memory 610. That is, the CPU 111 stores data of each candidate commodity in association with a row number (registration number) in the detail area 701 in which the data (commodity name, the unit price, the quantity and the amount) of the commodity specified from the candidate commodities is displayed (storage function).

If no commodity is selected (NO in ACT ST47), the CPU 111 displays a message 'no candidate' in the candidate area 703 on the registration screen 700 (ACT ST42). Then, the recognition result processing is ended.

If the decoding result of the barcode is output in ACT ST15 or the recognition result processing is ended in ACT ST20, then the CPU 111 proceeds to the processing in ACT ST21. In ACT ST21, it is confirmed whether or not there is an operation input from the keyboard 11 or the touch panel 12. If there is no operation input (NO in ACT ST21), the CPU 111 confirms whether or not there is a command input from the POS terminal 2 (ACT ST22). If there is no command input (NO in ACT ST22), the CPU 111 proceeds to the processing in ACT ST3.

That is, the CPU 111 clears the candidate commodity memory 610. Further, the CPU 111 resets the recognition processing flag F to be '0'. The processing in ACT ST5 is not carried out as the registration screen 700 is displayed. The CPU 111 acquires the images (frame images) photographed by the camera 14 through the image interface 114 (ACT ST6). Then, the CPU 111 carries out the processing in and after ACT ST7 again.

On the other hand, if an operation input from the keyboard 11 or the touch panel 12 is detected (YES in ACT ST21), the CPU 111 carries out an interruption processing corresponding to the operation input (ACT ST23). Likewise, when a command is received from the POS terminal 2 through the connection interface 116 (YES in ACT ST22), the CPU 111 carries out an interruption processing corresponding to the command (ACT ST24).

One of the interruptions processing corresponding to operation inputs is an interruption processing for inputting a registration row. The processing is started when it is detected according to a signal from the touch panel sensor 12*b* that the detail area 701 on the registration screen 700 is touched.

Figure 9:
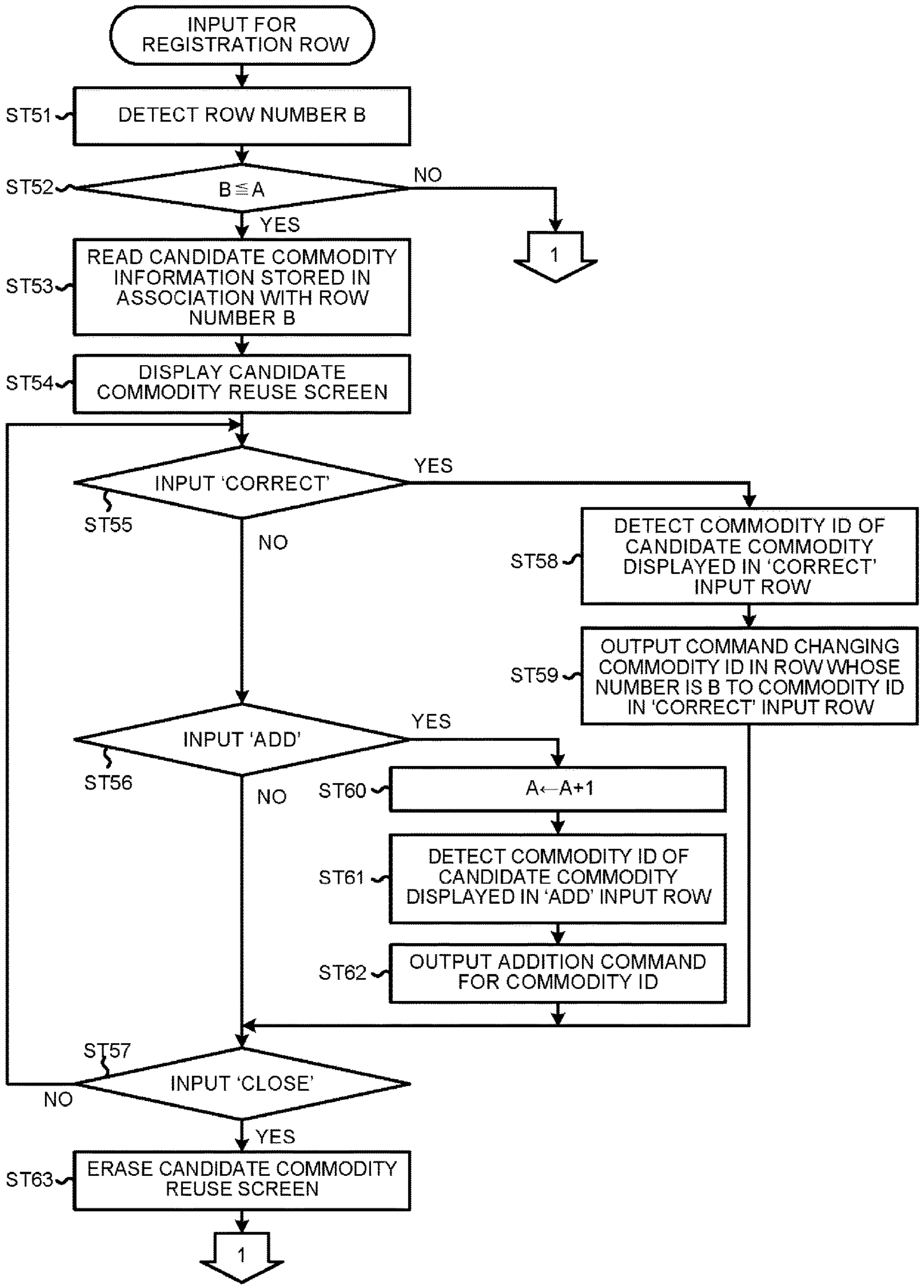
FIG. 9 is a flowchart specifically illustrating the procedure of an interruption processing for inputting a registration row.

The procedure of the interruption processing is shown in the flowchart of FIG. 9. First, the CPU 111 detects the row number B of the row at the touch position of the detail area 701 (ACT ST51). The CPU 111 confirms whether or not the row number B is below the value of the registration number counter A (ACT ST52). The case in which the row number B is greater than the value of the registration number counter A indicates an error operation of touching a row in which no commodity detail data is displayed. In this case (NO in ACT ST52), the registration row input processing is ended.

If the row number B is below the value of the registration number counter A (YES in ACT ST52), the CPU 111 deems that there is a selection request of the commodity displayed in the row corresponding to the row number B. Then, the CPU 111 retrieves the recognition result holding memory 620 to read the candidate commodity information stored in association with a registration number accordant with the row number B (ACT ST53). The CPU 111 edits a candidate commodity reuse screen 800 based on the candidate commodity information and displays the candidate commodity reuse screen 800 on the panel display section 12*a* (ACT ST54: redisplay function).

Figure 13:
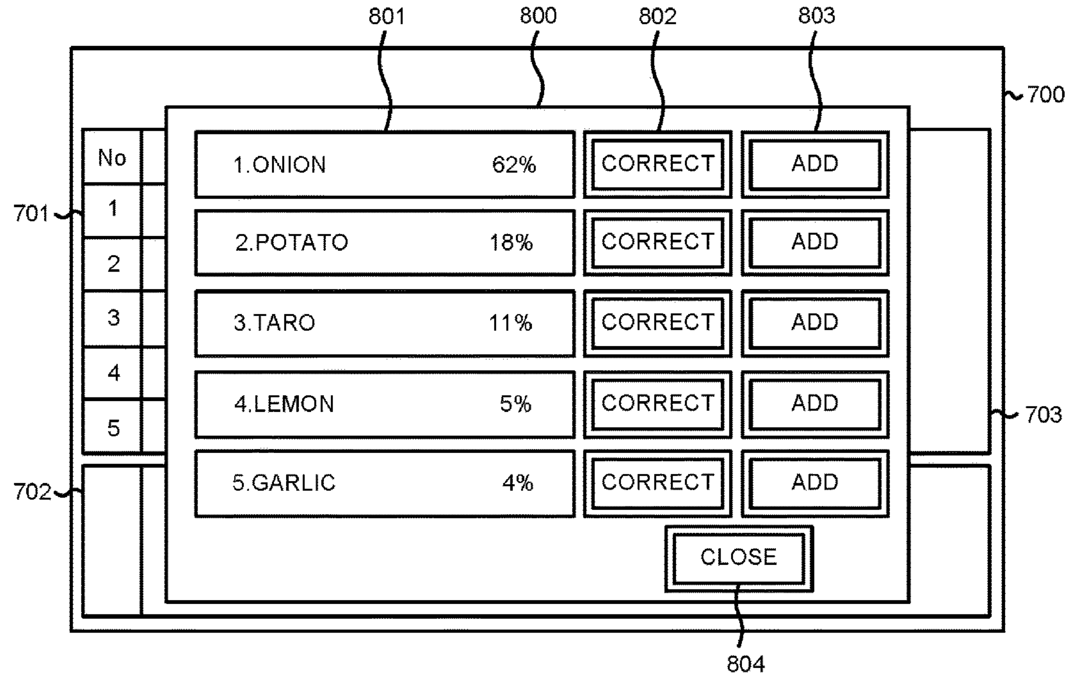
FIG. 13 is a plan view illustrating an example of a candidate commodity reuse screen.

An example of the candidate commodity reuse screen 800 is shown in FIG. 13. The candidate commodity reuse screen 800 includes a candidate commodity list 801 and button images of a 'correct' button 802, an 'add' button 803 and a 'close' button 804 for each candidate commodity. The name and the similarity degree of each candidate commodity are displayed in the candidate commodity list 801.

The CPU 111 waits for the touch input of an optional button image on the candidate commodity reuse screen 800 (ACT ST55, ACT ST56 and ACT ST57). If it is detected according to a signal from the touch panel sensor 12*b* that the 'correct' button 802 is touched and input (YES in ACT ST55), then the CPU 111 retrieves the candidate commodity information and detects the commodity ID of a commodity corresponding to the touched and input 'correct' button 802 (ACT ST58). Then, the CPU 111 generates a change command for changing the commodity ID (the commodity ID before the change) of the row number B to the commodity ID (the commodity ID after the change) of the commodity corresponding to the touched and input 'correct' button 802 and then sends the change command to the POS terminal 2 through the connection interface 116 (ACT ST59: reuse function). Then, the CPU 111 waits for the touch input of an optional button image on the candidate commodity reuse screen 800 again (ACT ST55, ACT ST56 and ACT ST57).

The CPU 211 of the POS terminal 2 which receives the change command cancels the sales data of the commodity recognized using the commodity ID before the change. Further, the CPU 211 retrieves the commodity master file to acquire commodity information, such as the commodity name and the unit price, of the commodity recognized using the changed commodity ID. Then, the CPU 211 registers commodity sales data containing sales volume and sales amount based on the commodity information detected from the commodity master file. Further, the CPU 211 sends the data of the commodity name, the unit price, the quantity and the amount of the commodity recognized using the changed commodity ID to the commodity recognition apparatus 1 through the connection interface 217. The CPU 111 of the commodity recognition apparatus 1 displays the commodity name, the unit price, the quantity and the amount received from the POS terminal 2 in the row having the row number B in the detail area 701 on the registration screen 700.

If it is detected according to a signal from the touch panel sensor 12*b* that the 'add' button 803 is touched and input (YES in ACT ST56), the CPU 11 only adds '1' to the registration number counter A (ACT ST60). Further, the CPU 111 retrieves the candidate commodity information to detect the commodity ID of the commodity corresponding to the touched and input 'add' button 803 (ACT ST61). Then, the CPU 111 generates an addition command for adding the commodity ID and sends the addition command to the POS terminal 2 through the connection interface 116 (ACT ST62). Sequentially, the CPU 111 waits for the touch input of an optional button image on the candidate commodity reuse screen 800 again (ACT ST55, ACT ST56 and ACT ST57).

The CPU 211 of the POS terminal 2 which receives the addition command retrieves the commodity master file to acquire commodity information, such as the commodity name and the unit price, of the commodity recognized using the added commodity ID. Then, the CPU 211 registers commodity sales data containing sales volume and sales amount based on the commodity information detected from the commodity master file. Further, the CPU 211 sends the data of the commodity name, the unit price, the quantity, the amount to the commodity recognition apparatus 1 through the connection interface 217. The CPU 111 of the commodity recognition apparatus 1 displays the data of the commodity name, the unit price, the quantity, the amount received from the POS terminal 2 in the detail area 701 on the registration screen 700 as well as on the display 13 for customer. At this time, in the detail area 701, the data is displayed in the row the row number of which is accordant with the value of the registration number counter A.

If it is detected according to a signal from the touch panel sensor 12*b* that the 'close' button 804 is touched and input (YES in ACT ST57), the CPU 111 erases the candidate commodity reuse registration screen 800. Then, the CPU 111 returns to the processing in ACT ST21 to confirm whether or not there is an operation input from the keyboard 11 or the touch panel 12.

One of the interruptions processing corresponding to commands from the POS terminal 2 is an interruption processing of receiving a settlement completion command. The settlement completion command is sent from the POS terminal 2 to the commodity recognition apparatus 1 when the closing key of the keyboard 21 is operated and input in the POS terminal 2.

Figure 10:
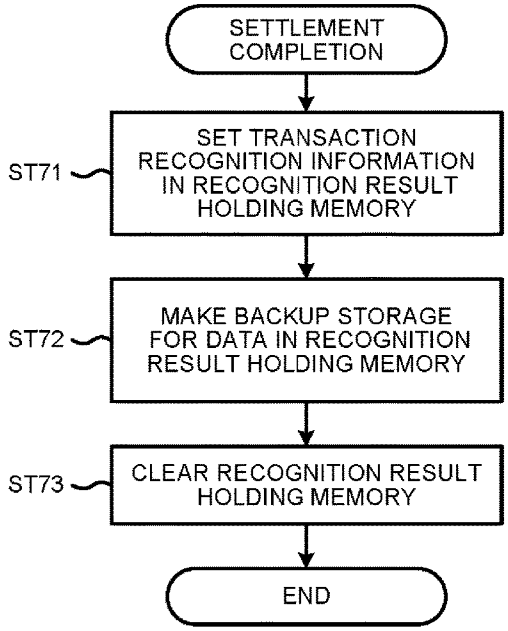
FIG. 10 is a flowchart specifically illustrating the procedure of an interruption processing for a settlement completion command.

The procedure of the interruption processing is shown in the flowchart of FIG. 10. First, the CPU 111 sets, in the recognition result holding memory 620, transaction recognition information including a transaction date, a registration number and a transaction number (ACT ST71). The transaction date and the registration number are set in the RAM 113 of the commodity recognition apparatus 1 in advance. The transaction number is the value of the transaction number counter Y.

If transaction recognition information is set in the recognition result holding memory 620, the CPU 111 writes the data of the recognition result holding memory 620 in a backup file. Next, the CPU 111 sends the backup file to the POS terminal 2 through the connection interface 116 and stores the backup file in the HDD 214 (ACT ST72). Sequentially, the CPU 111 clears the recognition result holding memory 620 (ACT ST73: clearing function). Then, the information processing carried out by the commodity recognition apparatus 1 for a commodity transaction is ended.

In the embodiment, the operator of the commodity recognition apparatus 1 takes a commodity from the shopping basket 6 at a time and then confirms whether or not the commodity M is affixed with a barcode. If the commodity M is affixed with a barcode, the operator holds the surface of the commodity M affixed with a barcode over the reading window 1B. If the commodity M is affixed with no barcode, the operator holds any surface of the commodity M over the reading window 1B.

The commodity M held over the reading window 1B is photographed by the camera 14. In the commodity recognition apparatus 1, if a commodity image is detected from the frame images photographed by the camera 14, then a barcode reading processing and a commodity recognition processing are carried out according to the commodity image. If the result is that a barcode is read, then the commodity ID decoded according to the barcode is sent to the POS terminal 2.

If no barcode can be read, then the recognition result processing is carried out. That is, when the maximum similarity degree of the candidate commodities recognized through a commodity recognition processing is above the determination threshold value Lmax, the commodity having the maximum similarity degree is specified as a commodity M held over the reading window 1B. If the maximum similarity degree is not above the determination threshold value Lmax, a list of candidate commodities the similarity degree of which is above the candidate threshold value Lmin are displayed on the touch panel 12. If a commodity is selected from the candidate commodities, then the commodity is specified as a commodity M held over the reading window 1B.

If a commodity held over a reading window 1B is specified, then the commodity ID of the commodity is sent to the POS terminal 2 from the commodity recognition apparatus 1. Further, in the commodity recognition apparatus 1, information of a candidate commodity recognized through a commodity recognition processing carried out when a commodity M is held over the reading window 1B is stored in the recognition result holding memory 620 in association with the value of the registration number counter A.

Every time a commodity ID is received from the commodity recognition apparatus 1, the sales data of the commodity recognized using the commodity ID is registered in the POS terminal 2. On the other hand, in the commodity recognition apparatus 1, the data of commodity name, unit price, quantity and amount of each commodity are displayed, according to the registered order of the commodities, in the detail area 701 on the registration screen 700 displayed on the touch panel 12.

FIG. 12 shows a registration screen 700 on which commodity ‘milk’ is registered as a first item, commodity ‘onion’ is registered as a second item and commodity ‘apple’ held by the user over the reading window 1B is being registered as a third item. Commodity ‘onion’ is affixed with no barcode. Thus, information of candidate commodities recognized through a commodity recognition processing carried out when commodity ‘onion’ is held over the reading window 1B is stored in the recognition result holding memory 620 in association with a registration number ‘2’.

In the screen shown in FIG. 12, the operator touches the button image 711 when the commodity held over the reading window 1B is ‘apple’. In this way, the sales data of commodity ‘apple’ is registered in the POS terminal 2. In the commodity recognition apparatus 1, the name, the unit price, the quantity and the amount of commodity ‘apple’ are displayed in the row the row number of which is ‘3’ in the detail area 701. Further, information of candidate commodities ‘apple’, ‘persimmon’ and ‘peach’ is stored in the recognition result holding memory 620 in association with a registration number ‘3’.

At this time, if the operator touches the button image 712 by mistake, then the sales data of commodity ‘persimmon’ is registered in the POS terminal 2. In this case, information of candidate commodities ‘apple’, ‘persimmon’ and ‘peach’ is stored in the recognition result holding memory 620 in association with a registration number ‘3’.

It is assumed now that the operator realized that due to the error operation, the second item commodity is ‘potato’ instead of ‘onion’. In this case, the operator touches the row the row number of which is ‘2’ in the detail area 701. In this way, in the commodity recognition apparatus 1, a candidate commodity reuse screen 800, which is edited based on the information of the candidate commodity stored in the recognition result holding memory 620 in association with the registration number ‘2’, is displayed on the panel display section 12*a* of the touch panel 12.

FIG. 13 is an example of the candidate commodity reuse screen 800. This example is a case where ‘onion’, ‘potato’, ‘taro’, ‘lemon’ and ‘garlic’ are recognized as candidate commodities in descending order of similarity degree when commodity ‘potato’ is held over the reading window 1B. The operator who confirmed the candidate commodity reuse screen 800 touches the ‘correct’ button 802 corresponding to the ‘potato’ on the screen. In this way, a change command indicating that the commodity ID of commodity ‘onion’ is the commodity ID before the change and that of the commodity ‘potato’ is the commodity ID after the change is generated in the commodity recognition apparatus 1 and sent to the POS terminal 2.

In the POS terminal 2, the sales data of commodity ‘potato’ is registered for the sales data of commodity ‘onion’ is cancelled. As shown in FIG. 14, in the commodity recognition apparatus 1, the commodity name, the unit price, the quantity and the amount of commodity 'potato' are displayed in the row the row number of which is '2' in the detail area 701.

Next, it is assumed that the fourth item is 'taro'. At this time, the operator touches the row the row number of which is '2' in the detail area 701. In this case, the candidate commodity reuse screen 800 shown in FIG. 13 is displayed on the panel display section 12*a*, thus, the operator touches the 'add' button 803 corresponding to the 'taro' on the screen. Consequentially, an addition command of adding the commodity ID of commodity 'taro' is generated in the commodity recognition apparatus 1 and sent to the POS terminal 2.

The sales data of commodity 'taro' is registered in the POS terminal 2. In the commodity recognition apparatus 1, the commodity name, the unit price, the quantity and the amount of commodity 'taro' are displayed in the row the row number of which is '4' in the detail area 701.

In this way, the commodity recognition apparatus 1 described in the embodiment stores information of the candidate commodities recognized through a commodity recognition processing in the recognition result holding memory 620 in association with information (registration number) relating to the specific commodity specified from the candidate commodities. Then, if a selection request of the specific commodity is accepted through the touch input on the registration screen 700 displayed on the touch panel 12, then the candidate commodity reuse screen 800 is displayed on the touch panel 12 based on the information of the candidate commodities stored in the recognition result holding memory 620 in association with the information relating to the specific commodity. Thus, information of candidate commodities recognized through a commodity recognition processing based on a photographed image of a commodity can be confirmed even if the commodity is not held over the reading window 1B again.

Further, the 'correct button 802 and the add' button 803 are displayed on the candidate commodity reuse screen 800 corresponded to each candidate commodity. Then, if the 'correct' button 802 is input, the sales data of a specific commodity with a selection request is cancelled in the commodity recognition apparatus 1. Sequentially, instead of this, the sales data of the candidate commodity corresponding to the 'correct' button 802 is registered. Thus, the sales data of a commodity affixed with no barcode can be corrected without holding the commodity over the reading window 1B again.

When the add' button is input, the commodity ID of the candidate commodity corresponding to the 'add' button 803 is output to the POS terminal 2 in the commodity recognition apparatus 1. The sales data of the commodity recognized with the commodity ID is registered in the POS terminal 2. Thus, the sales data of any similar commodity listed in a candidate commodity list, even if affixed with no barcode, can be registered without holding the commodity over the reading window 1B.

Embodiment 2

FIG. 15 is a schematic diagram illustrating the area structure of the recognition result holding memory 630 according to embodiment 2. In embodiment 1, information of candidate commodities is stored in the recognition result holding memory 620 in association with information relating to a specific commodity specified from the candidate commodities. As shown in FIG. 15, in embodiment 2, an commodity image, instead of information of a candidate commodity, is stored.

Further, FIG. 1-FIG. 5 described in embodiment 1, that is, the external view of the store checkout system, the block diagram illustrating hardware configurations of the commodity recognition apparatus and the POS terminal, the schematic diagram illustrating the structure of dictionary data of each commodity stored in the recognition dictionary file and the schematic diagram illustrating the area structure of the candidate commodity memory, are identical in embodiments 1 and 2, and are therefore directly used in embodiment 2. Moreover, FIG. 6, FIG. 7 and FIG. 10 described in embodiment 1, that is, the flowchart illustrating a procedure of the information processing carried out by the CPU of the commodity recognition apparatus according to a commodity recognition program, the flowchart specifically illustrating the procedure of a commodity recognition processing and the flowchart specifically illustrating the procedure of an interruption processing for a settlement completion command, are identical in embodiments 1 and 2, and are therefore directly used in embodiment 2.

Figure 16:
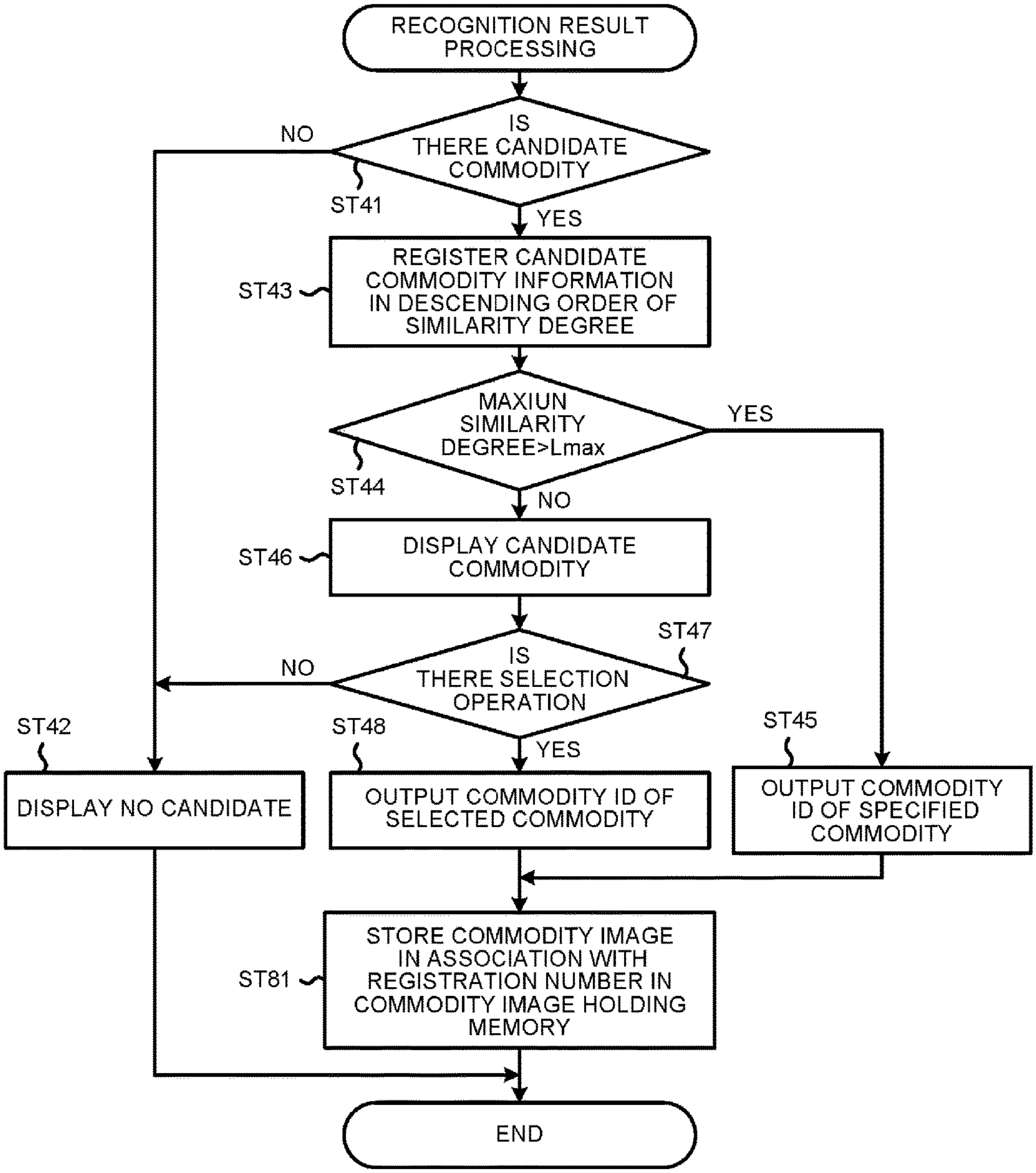
FIG. 16 is a flowchart specifically illustrating the procedure of a recognition result processing.

FIG. 16 is a flowchart specifically illustrating the procedure of a recognition result processing according to embodiment 2. In FIG. 16, the processing operation identical to that described in embodiment 1 shown in FIG. 8 is denoted with the same symbol. It can be known from the comparison of FIG. 16 with FIG. 8 that embodiment 2 is different from embodiment 1 in the ACTs after ACT ST45 or ACT ST48.

That is, in embodiment 1, the CPU 111 stores the value of the registration number counter A and candidate commodity information in the recognition result holding memory 620 (ACT ST49). In embodiment 2, the CPU 111 stores the value of the registration number counter A and a commodity image in the recognition result holding memory 620 (ACT ST81). The commodity image refers to the whole or part of the commodity image which is detected from photographed images in the newly processing in ACT ST7.

Figure 17:
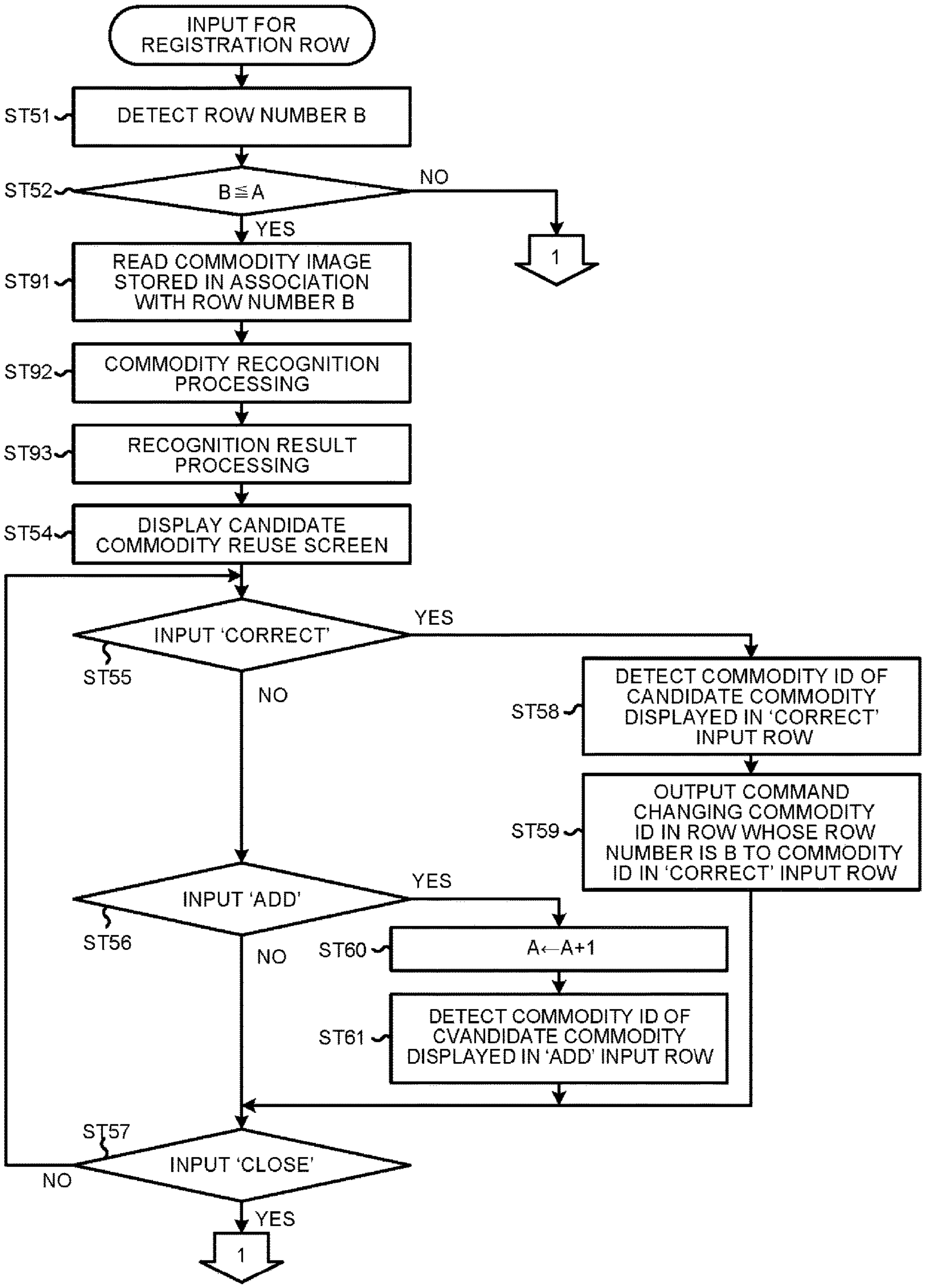
FIG. 17 is a flowchart specifically illustrating the procedure of an interruption processing for inputting a registration row.

FIG. 17 is a flowchart specifically illustrating the procedure of an interruption processing for inputting a registration row according to embodiment 2. Further, the processing operation identical to that described in embodiment 1 shown in FIG. 9 is denoted with the same symbol. It can be known from the comparison of FIG. 17 with FIG. 9 that embodiment 2 is different from embodiment 1 in that the processing in ACT ST53 is replaced by the processing in ACT ST91-ACT ST93.

That is, in embodiment 1, the row number B of the row at a touch position in the detail area 701 is detected (ACT ST51). When the row number B is below the value of the registration number counter A (YES in ACT ST52), the CPU 111 retrieves the recognition result holding memory 620 to read the candidate commodity information stored in association with a registration number accordant with the row number B (ACT ST53).

In embodiment 2, when the row number B is below the value of the registration number counter A (YES in ACT ST52), the CPU 111 retrieves the recognition result holding memory 630 to read a commodity image stored in association with the registration number accordant with the row number B (ACT ST91). Then, the CPU 111 carries out the commodity recognition processing identical to that in embodiment 1 (refer to FIG. 7) using the commodity image (ACT ST92). Next, the CPU 111 carries out a recognition result processing in the procedure of which is shown in the flowchart of FIG. 16 (ACT ST93). However, the CPU 111 edits the candidate commodity reuse screen 800 based on the candidate commodity information acquired from the recognition result processing and displays it on the panel display section 12*a* (ACT ST54).

Then, the CPU 111 waits for the touch input of an optional button image on the candidate commodity reuse screen 800 again (ACT ST55, ACT ST56 and ACT ST57). Here, the processing carried out after the 'correct' button 802, the 'add' button 803 or the 'close' button 804 is input is identical to that described in embodiment 1.

The embodiment 2 having such a structure also has the same effect in embodiments 1.

Further, the present invention is not limited to the embodiments above.

For example, in the embodiments described above, it is exemplarily described a case where a selection request of a specific commodity is accepted if the touch in the detail area 701 on the registration screen 700 displayed on the touch panel 12 is detected. The selection request of a specific commodity is not limited to this case. For example, the selection request of a specific commodity is accepted if it is detected that a row number B is input through a key operation on the keyboard 11. Alternatively, the selection request of a specific commodity may be accepted by inputting a command generated through the key operation in the POS terminal 2.

Further, in the embodiments described above, the recognition result holding memory 620 is cleared when a settlement completion command is received from the POS terminal 2. The recognition result holding memory 620 is not limited to be cleared at this timing. For example, the recognition result holding memory 620 may be cleared at a time predetermined time elapsed after a settlement completion command is received. Alternatively, the recognition result holding memory 620 may be cleared after the settlement completion command is received for a given multiple times.

Further, in the viewpoint of saving storage capacity, it is preferable that the data of the recognition result holding memory 620 stored in the backup file of the HDD 214 is cleared at the close of every business day or every a given business days elapsed.

Further, in the embodiments described above, the CPU 111 of the commodity recognition apparatus 1 has all the functions (programs) of a processor. The CPU 111 of the commodity recognition apparatus 1 and the CPU 211 of the POS terminal 2 may separately have part of the functions of a processor. Alternatively, the commodity recognition apparatus 1 may be incorporated into the POS terminal 2 to be configured integrally, and the CPU 211 of the POS terminal 2 may have a function as a processor. In this case, the candidate commodity memory 610 and the recognition result holding memories 620 and 630 can be guaranteed in the area in the RAM 213 of the POS terminal 2.

Further, the memory areas may be formed in a memory medium different from the RAM, such as the HDD 214. In the embodiment, the memory medium holding information of a candidate commodity recognized from a commodity image or the commodity image all fall into the scope of a memory.

Further, in the embodiments above, a control program for achieving the functions of the present invention is pre-stored in the ROM 112 serving as a program storage section in the apparatus. However, the present invention is not limited to this case, the same program can also be downloaded to the apparatus from a network, or the same program recorded in a recording medium may be installed in the apparatus. The recording medium may be in any form as long as the recording medium can store programs and apparatus-readable, like a CD-ROM and a memory card and the like. Further, the functions acquired by the installation or the downloading of the program can be also achieved synergistically acting with the OS (Operating System) inside the apparatus. Moreover, the program according to the embodiments may be incorporated into a portable information terminal such as a portable telephone having a communication function or the called PDA to realize the function.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. A commodity recognition apparatus, comprising:

an image interface that acquires an image photographed by a camera for photographing a commodity;

a processor configured to detect an image of a barcode and a commodity from the image acquired via the image interface, read a barcode affixed to the commodity, from the image of the commodity, decode the barcode, and if the barcode cannot be decoded, recognize from the image, candidate commodities similar to the commodity shown in the image;

a number counter configured to incrementally increase a number every time a recognition process by the processor is finished;

a display configured to display information of a specified commodity with the number of the number counter every time a candidate commodity is specified from the candidate commodities recognized at the recognition process as the commodity shown in the image;

a memory configured to store information of the candidate commodities in association with the number of the number counter every time a candidate commodity is specified from the candidate commodities recognized at the recognition process as the commodity shown in the image; and an input device configured to input the number;

wherein the processor is configured to display on the display, if the number is input through the input device, a list of the candidate commodities stored in the memory in association with the number, incrementally increase a number of the number counter when any one of the candidate commodities in the list is selected through the input device, and display on the display information of the selected candidate commodity with the incrementally-increased number.

2. The commodity recognition apparatus according to claim 1 further comprising an interface configured to output, every time a candidate commodity is specified from the candidate commodities recognized by the recognition process as the commodity shown in the image, identifying information of the specified candidate commodity to a settlement terminal.

3. The commodity recognition apparatus according to claim 2, wherein if any one of the candidate commodities in the list is selected through the input device, the processor outputs a command to add identifying information of the selected candidate commodity to the settlement terminal through the interface.

4. The commodity recognition apparatus according to claim 3, wherein the list of the candidate commodities includes images of button, each being displayed in association with a name of each of the candidate commodities, if any one of the images of button is operated through the input device, the processor is assumed that a candidate commodity with a name associated with the image of button is selected.

5. The commodity recognition apparatus according to claim 1, wherein the processor reads the barcode from an image of the commodity acquired through an image interface, and recognizes, from the image acquired through the image interface, the candidate commodities similar to the commodity shown in the image if no barcode is read.

6. A commodity recognition apparatus, comprising:

an image interface that acquires an image photographed by a camera for photographing a commodity;

a processor configured to detect an image of a barcode and a commodity from the image acquired via the image interface, read a barcode affixed to the commodity, from the image of the commodity, decode the barcode, and if the barcode cannot be decoded, recognize from the image, candidate commodities similar to the commodity shown in the image;

a number counter configured to incrementally increase a number every time a recognition process by the processor is finished;

a display configured to display information of a specified commodity with the number of the number counter every time a candidate commodity is specified from the candidate commodities recognized at the recognition process as the commodity shown in the image;

a memory configured to store information of the candidate commodities in association with the number of the number counter every time a candidate commodity is specified from the candidate commodities recognized at the recognition process as the commodity shown in the image; and an input device configured to input the number;

wherein the processor is configured to display on the display, if the number is input through the input device, a list of the candidate commodities stored in the memory in association with the number, and if any one of the candidate commodities in the list is selected through the input device, change the information of the specified commodity displayed on the display with the input number to information of the selected candidate commodity.

7. The commodity recognition apparatus according to claim 6 further comprising an interface configured to output, every time a candidate commodity is specified from the candidate commodities recognized by the recognition process as the commodity shown in the image, identifying information of the specified candidate commodity to a settlement terminal.

8. The commodity recognition apparatus according to claim 7, wherein if any one of the candidate commodities in the list is selected through the input device, the processor outputs, to the settlement terminal through the interface, a command to change identifying information of the specified candidate commodity to identifying information of the selected candidate commodity.

9. The commodity recognition apparatus according to claim 8, wherein the list of the candidate commodities includes images of button, each being displayed in association with a name of each of the candidate commodities, if any one of the images of button is operated through the input device, the processor is assumed that a candidate commodity with a name associated with the image of button is selected.

10. The commodity recognition method according to claim 6, further comprising:

reading, by the processor, the barcode from an image of the commodity acquired through an image interface; and recognizing, by the processor from the image acquired through the image interface, the candidate commodities similar to the commodity shown in the image if no barcode is read.

11. A commodity recognition method, comprising:

acquiring, by a processor, an image photographed by a camera for photographing a commodity;

detecting, by the processor, an image of a barcode and the commodity from the image acquired;

reading, by the processor, a barcode affixed to the commodity from the image of the commodity;

decoding, by the processor, the barcode based on the barcode being read by the processor;

and if the barcode cannot be decoded, recognizing, by the processor, from the image subjected to reading of the barcode, candidate commodities similar to a commodity shown in the image of a commodity photographed;

incrementally increasing a number of a number counter every time a recognition process by the processor is finished;

displaying information of a specified commodity with the number of the number counter every time a candidate commodity is specified from the candidate commodities recognized at the recognition process as the commodity shown in the image, and storing information of the candidate commodities in association with the number of the number counter;

displaying a list of the candidate commodities stored in association with the number if the number is input; and incrementally increasing a number of the number counter when any one of the candidate commodities in the list is selected through the input device, and displaying information of the specified candidate commodity with the incrementally-increased number.

12. The commodity recognition method according to claim 11, further comprising outputting a command to add identifying information of the selected candidate commodity to a settlement terminal if any one of the candidate commodities in the list is selected.

* * * * *